US011617106B2

United States Patent
Amano

(10) Patent No.: US 11,617,106 B2
(45) Date of Patent: Mar. 28, 2023

(54) INFORMATION PROCESSING APPARATUS, INFORMATION PROCESSING METHOD, AND NON-TRANSITORY COMPUTER READABLE MEDIUM

(71) Applicant: FUJIFILM Business Innovation Corp., Tokyo (JP)

(72) Inventor: Yasushi Amano, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 511 days.

(21) Appl. No.: 16/558,174

(22) Filed: Sep. 2, 2019

(65) Prior Publication Data

US 2020/0305023 A1    Sep. 24, 2020

(30) Foreign Application Priority Data

Mar. 22, 2019  (JP) .............................. JP2019-055627

(51) Int. Cl.
*H04W 28/02* (2009.01)
*H04W 4/80* (2018.01)
(Continued)

(52) U.S. Cl.
CPC ...... *H04W 28/065* (2013.01); *H04N 1/00103* (2013.01); *H04W 4/80* (2018.02); *H04W 28/0236* (2013.01); *H04W 28/0278* (2013.01)

(58) Field of Classification Search
CPC . H04W 4/80; H04W 28/065; H04W 28/0236; H04W 28/0278; H04N 1/00103
See application file for complete search history.

(56) References Cited

U.S. PATENT DOCUMENTS 10,111,074 B2    10/2018  Inoue
2016/0014549 A1*  1/2016  Jones ................... H04W 4/80
                                                        455/41.1
(Continued)

FOREIGN PATENT DOCUMENTS

JP    2017022655    1/2017
JP    2017175445    9/2017

OTHER PUBLICATIONS

"Office Action of Japan Counterpart Application", dated Jan. 10, 2023, with English translation thereof, pp. 1-5.

*Primary Examiner* — Brian P Cox
(74) *Attorney, Agent, or Firm* — JCIPRNET

(57) ABSTRACT

An information processing apparatus includes: an information processing unit that performs plural types of information processing for exchanging information with a device; a wireless communication unit that is capable of transmitting and receiving a radio-wave or spatial-light wireless signal to and from the device; and a communication control unit that controls the wireless communication unit so as to transmit, as a wireless signal, advertisement packets correlated with one or more types of information processing and including communication information that is necessary to exchange information or information to be provided, the communication control unit performing control so as to continue time-division transmission of the advertisement packets while adding or deleting a type of the advertisement packets to be transmitted in accordance with a state of execution of the processing by the information processing unit.

16 Claims, 9 Drawing Sheets

(51) Int. Cl.
*H04W 28/06* (2009.01)
*H04N 1/00* (2006.01)

(56) References Cited

U.S. PATENT DOCUMENTS

| | | | |
|---|---|---|---|
| 2017/0272270 A1* | 9/2017 | Gu | H04B 17/318 |
| 2018/0084372 A1* | 3/2018 | Tachiwa | H04W 8/005 |
| 2018/0124138 A1* | 5/2018 | Kamthe | H04L 2101/622 |
| 2019/0007818 A1 | 1/2019 | Inoue | |

* cited by examiner

| SERVICE NAME | UUID | TRANSMISSION CONDITION | | ATTRIBUTE | | |
|---|---|---|---|---|---|---|
| | | DURATION | TRANSMISSION INTERVAL | RESIDENT | CONNECTION | JOB DEPENDENCY |
| IP ADDRESS NOTIFICATION | UUID-1 | 10 s | 100 ms | YES | NO | NO |
| POSITION NOTIFICATION 1 | UUID-21 | 20 s | 200 ms | YES | NO | YES |
| POSITION NOTIFICATION 2 | UUID-22 | 20 s | 200 ms | YES | NO | YES |
| ADDRESS BOOK REGISTRATION | UUID-3 | 30 s | 300 ms | NO | YES | NO |

| NO | UUID | DURATION | TRANSMISSION INTERVAL | DATA CONTENT |
|---|---|---|---|---|
| 1 | UUID-1 | 10 s | 100 ms | XXXXXXXX |
| 2 | UUID-21 | 20 s | 200 ms | Y1Y1Y1Y1 |
| 3 | UUID-22 | 20 s | 200 ms | Y2Y2Y2Y2 |

FIG. 8A

TIME BAND T1

| NO | UUID | DURATION | TRANSMISSION INTERVAL | DATA CONTENT |
|---|---|---|---|---|
| 1 | UUID-1 | 10 s | 100 ms | XXXXXXXX |
| 2 | UUID-21 | 20 s | 200 ms | Y1Y1Y1Y1 |
| 3 | UUID-22 | 20 s | 200 ms | Y2Y2Y2Y2 |

TIME BAND T2

| NO | UUID | DURATION | TRANSMISSION INTERVAL | DATA CONTENT |
|---|---|---|---|---|
| 1 | UUID-1 | 10 s | 100 ms | XXXXXXXX |

TIME BAND T3

| NO | UUID | DURATION | TRANSMISSION INTERVAL | DATA CONTENT |
|---|---|---|---|---|
| 1 | UUID-1 | 10 s | 100 ms | XXXXXXXX |
| 2 | UUID-3 | 30 s | 300 ms | ZZZZZZZZ |

TIME BAND T4

| NO | UUID | DURATION | TRANSMISSION INTERVAL | DATA CONTENT |
|----|--------|----------|----------------------|--------------|
| 1  | UUID-1 | 10 s     | 100 ms               | XXXXXXXX     |
| 2  | UUID-3 | 30 s     | 300 ms               | ZZZZZZZZ     |
| 3  | UUID-21| 20 s     | 200 ms               | Y1Y1Y1Y1     |
| 4  | UUID-22| 20 s     | 200 ms               | Y2Y2Y2Y2     |

TIME BAND T5

| NO | UUID | DURATION | TRANSMISSION INTERVAL | DATA CONTENT |
|----|--------|----------|----------------------|--------------|
| 1  | UUID-1 | 10 s     | 100 ms               | XXXXXXXX     |
| 2  | UUID-21| 20 s     | 200 ms               | Y1Y1Y1Y1     |
| 3  | UUID-22| 20 s     | 200 ms               | Y2Y2Y2Y2     |

72

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-055627 filed Mar. 22, 2019.

BACKGROUND

(i) Technical Field

The present disclosure relates to an information processing apparatus, an information processing method, and a non-transitory computer readable medium.

(ii) Related Art

Japanese Unexamined Patent Application Publication No. 2017-175445 discloses a communication device that transmits advertising packets (hereinafter also referred to as "advertisement packets") having a plurality of types of formats in a time-division manner. The document also indicates that a user is able to select the type of the format of the advertisement packets to be transmitted via a setting screen displayed on the device.

SUMMARY

It is assumed that, when a plurality of types of information processing for exchanging information with the device are performed, the state of execution of the various types of processing is varied from moment to moment in accordance with the status of use of an information processing apparatus. In the case where the type of the advertisement packets is set through an operation by the user, however, it is required to change the setting as necessary, which may be troublesome to the user.

Aspects of non-limiting embodiments of the present disclosure relate to reducing the number of man-hours required of the user to set the type of the advertisement packets when a plurality of types of information processing for exchanging information with the device are performed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: an information processing unit that performs a plurality of types of information processing for exchanging information with a device; a wireless communication unit that is capable of transmitting and receiving a radio-wave or spatial-light wireless signal to and from the device; and a communication control unit that controls the wireless communication unit so as to transmit, as a wireless signal, advertisement packets correlated with one or more types of information processing and including communication information that is necessary to exchange information or information to be provided, the communication control unit performing control so as to continue time-division transmission of the advertisement packets while adding or deleting a type of the advertisement packets to be transmitted in accordance with a state of execution of the processing by the information processing unit.

BRIEF DESCRIPTION OF THE DRAWINGS

An exemplary embodiment of the present disclosure will be described in detail based on the following figures, wherein:

FIG. 4A illustrates an example of the structure of data of packet transmission information in FIG. 3;

FIG. 4B illustrates an example of the structure of data of a transmission management list in FIG. 3;

FIGS. 8A to 8C are each a transition view illustrating the result of update of the transmission management list; and FIGS. 9A and 9B are each a transition view illustrating the result of update of the transmission management list.

DETAILED DESCRIPTION

An information processing apparatus according to an exemplary embodiment of the present disclosure will be described, in relation to an information processing method and an information processing program, with reference to the accompanying drawings. As a matter of course, the present disclosure is not limited to the exemplary embodiment described below, and may be changed freely without departing from the scope and spirit of the present disclosure. Various configurations may be combined with each other unless any technical contradiction occurs.

[Configuration of Image Forming Apparatus 12]
<Overall Configuration of Information Processing System 10>

Figure 1:
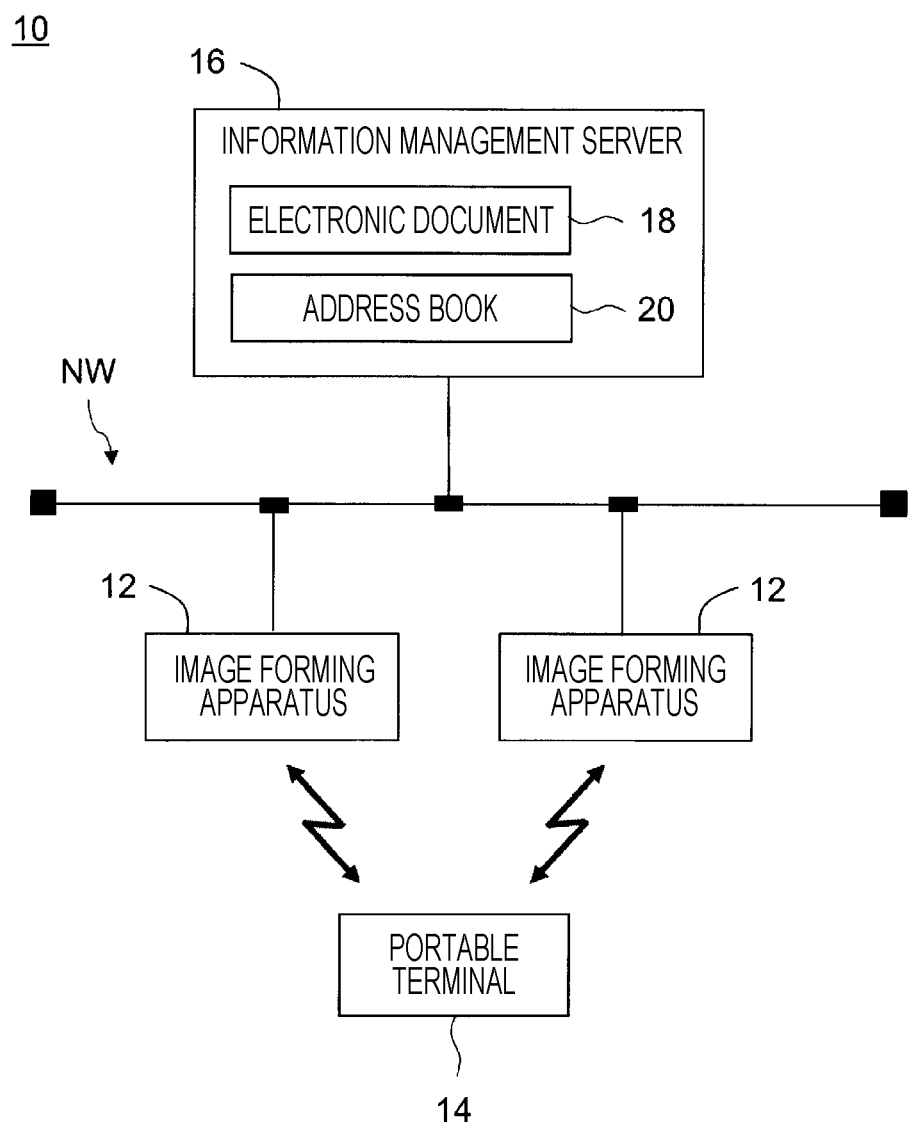
FIG. 1 illustrates the overall configuration of an information processing system that incorporates an image forming apparatus that serves as an information processing apparatus according to an exemplary embodiment of the present disclosure.

FIG. 1 illustrates the overall configuration of an information processing system 10 that incorporates an image forming apparatus 12 that serves as an information processing apparatus according to an exemplary embodiment of the present disclosure. The information processing system 10 is a system that is capable of providing, in a composite manner, an "image forming service" for providing a formed image object to a user in an area of installation and an "information processing service" for exchanging various types of information associated with the image forming service.

The information processing system 10 includes one or a plurality of image forming apparatuses 12, one or a plurality of portable terminals 14 (corresponding to "devices"), and an information management server 16. In the example in the drawing, two image forming apparatuses 12 and the information management server 16 are connected to each other via a narrow-area network NW built in the area of installation.

The image forming apparatuses 12 are each a digital multi-function device (so-called multi-function peripheral (MFP)) that executes at least one of a printer function, a copy function, a scan function, a facsimile function, and a data transmission function.

The portable terminal 14 is a multi-function multi-purpose device that is usable while being carried by the user. Specific examples include a tablet, a smartphone, an IoT terminal, and a wearable computer. The portable terminal 14 is wirelessly communicable with the image forming apparatuses 12.

The information management server 16 may store information (e.g. user information, security information, and data management information) that is necessary for operation of the image forming apparatuses 12, and provide such information at appropriate times in response to a request from the image forming apparatuses 12. In the example in the drawing, the information management server 16 stores an electronic document 18 and an address book 20.

<Configuration of Image Forming Apparatus 12>

Figure 2:
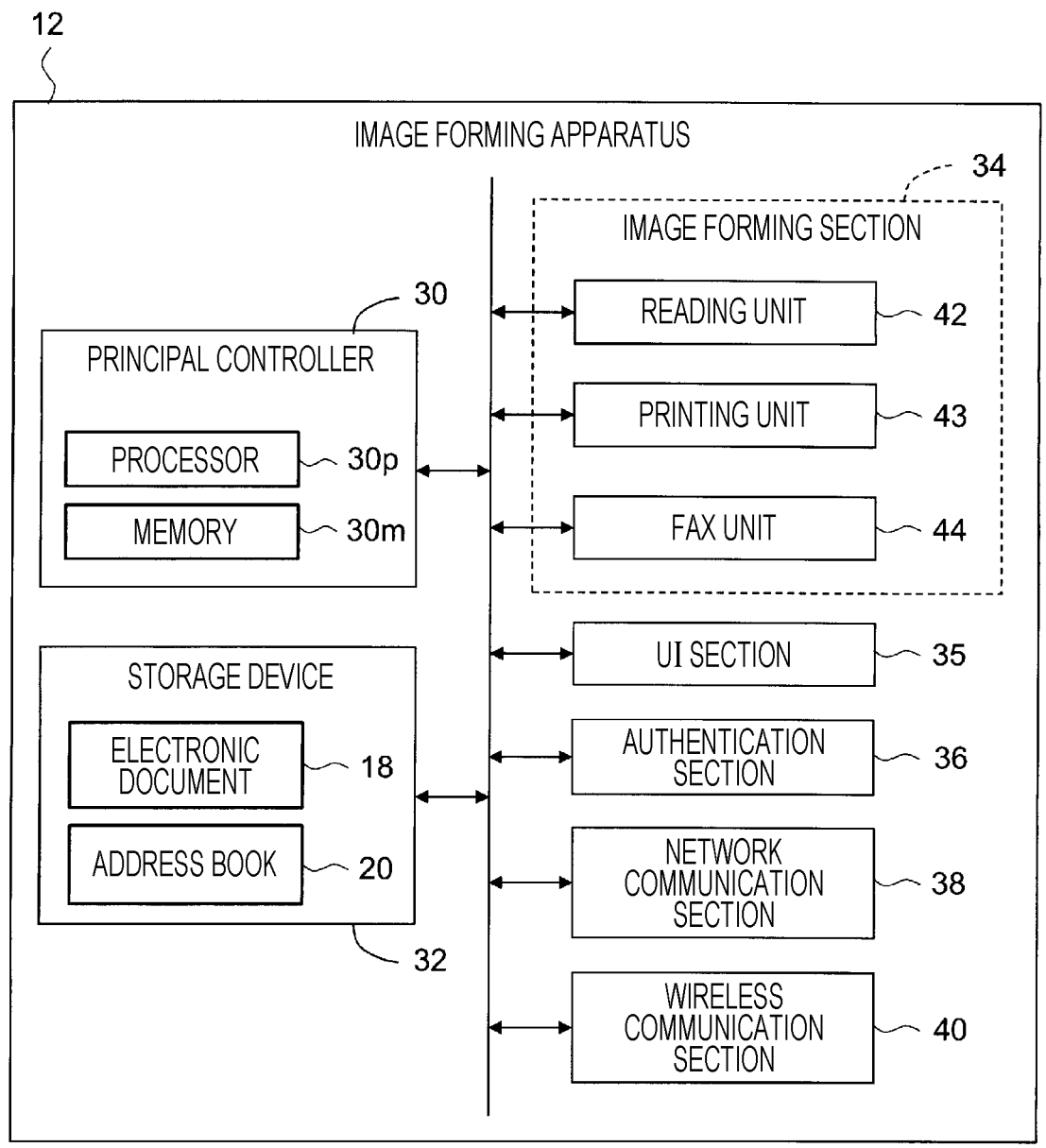
FIG. 2 is an electrical block diagram of the image forming apparatus illustrated in FIG. 1.

FIG. 2 is an electrical block diagram of the image forming apparatus 12 illustrated in FIG. 1. The image forming apparatus 12 includes a principal controller 30, a storage device 32, an image forming section 34, a user interface section (hereinafter referred to as a "UI section") 35, an authentication section 36, a network communication section 38, and a wireless communication section 40 (corresponding to a "wireless communication unit").

The image forming section 34 includes a reading unit 42 that reads paper to generate image data, a printing unit 43 that outputs printed matter on the basis of the image data, and a facsimile (FAX) unit 44 that transmits and receives a facsimile. The UI section 35 is composed of a touch screen display and a hardware button, for example, and receives an operation input by the user. The authentication section 36 authenticates the user who is authorized to use a service using a variety of authentication methods including password authentication, card authentication, and biometric authentication.

The network communication section 38 is a communication module that performs network communication with an external device including the information management server 16. The wireless communication section 40 is a communication module that performs wireless communication with an external device including the portable terminal 14. The "wireless communication" includes not only wireless communication in the narrow sense performed using radio waves, but also spatial light communication (specifically infrared light communication and visible light communication) performed using spatial light. Examples of the standard for wireless communication include Bluetooth Low Energy (BLE).

The principal controller 30 is a device that includes a program 30$p$ and a memory 30$m$, and that comprehensively controls the various components of the image forming apparatus 12. The processor 30$p$ is a process computation device that includes a central processing unit (CPU) and a micro-processing unit (MPU). The memory 30$m$ is a storage medium that is non-transitory and computer-readable.

The storage device 32 is constituted of a hard disk drive (HDD) or a solid state drive (SSD), for example, and stores a variety of data handled by the image forming apparatus 12. In the example in the drawing, the storage device 32 stores an electronic document 18 and an address book 20.

Figure 3:
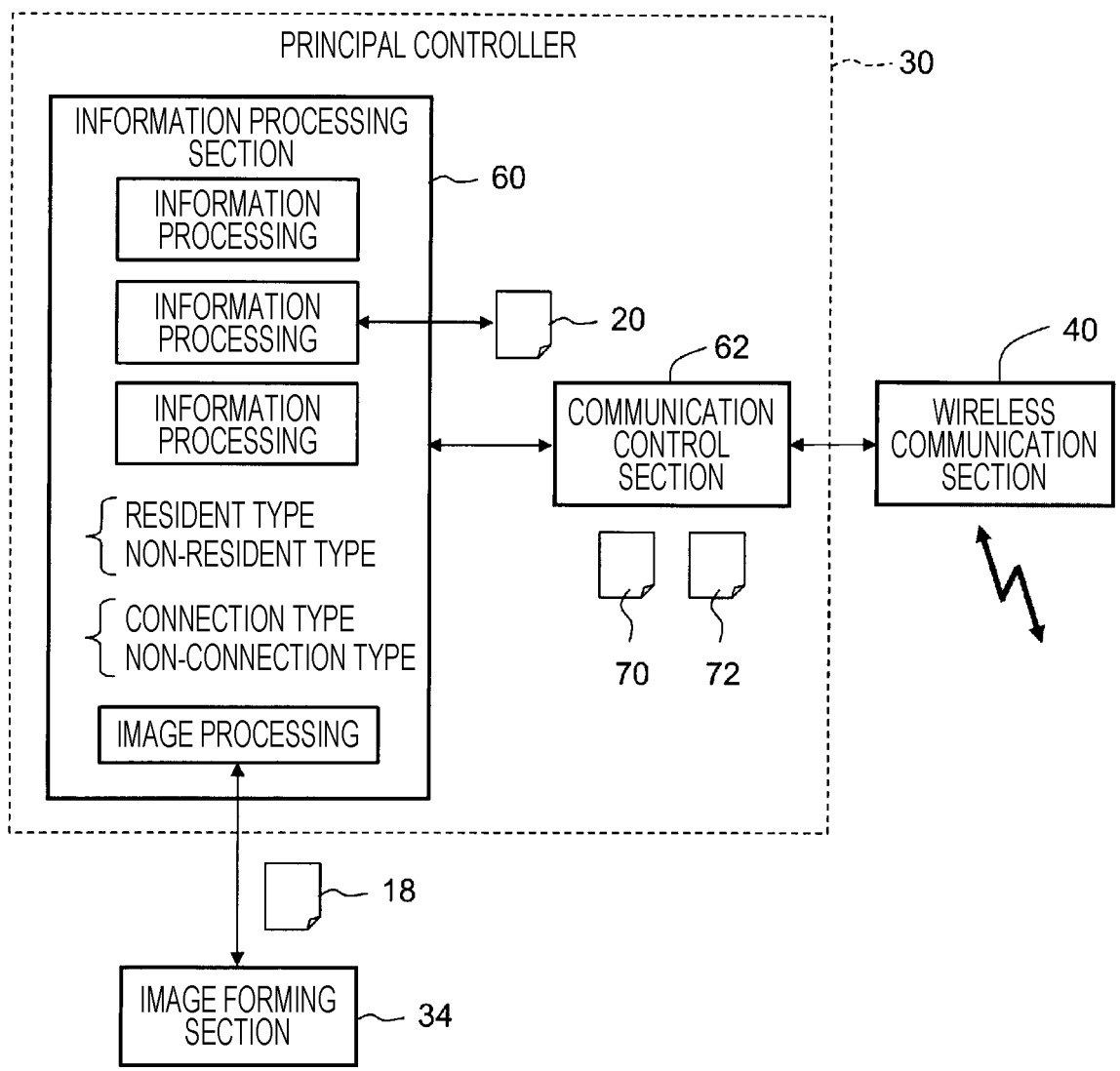
FIG. 3 is a functional block diagram of a principal controller illustrated in FIG. 2.

FIG. 3 is a functional block diagram of the principal controller 30 illustrated in FIG. 2. The processor 30$p$ of the principal controller 30 functions as an information processing section 60 (corresponding to an "information processing unit") and a communication control section 62 (corresponding to a "process control unit") by reading a program related to the image forming service and the information processing service from the memory 30$m$ and executing the program.

The information processing section 60 is capable of executing a plurality of types of "image processing" for processing image information in a manner that is suitable for the type of an image forming job, and a plurality of types of "information processing" for exchanging information with the portable terminal 14. Each processing is defined as different types in accordance with the type of input information, the type of output information, and a program (or software components) packaged in the image forming apparatus 12, for example. Each information processing is classified into resident and non-resident types and connection and non-connection types to be discussed later.

Specific examples of the information processing include [1] a process for notifying the portable terminal 14 of a first type of the IP address of the image forming apparatus 12, [2] a process for notifying the portable terminal 14 of a second type of positional information on the image forming apparatus 12, and [3] a process of registering user information including a mail address in the address book 20 through an operation of the portable terminal 14 of a third type.

The communication control section 62 performs communication control for transmitting and receiving a radio-wave or spatial-light wireless signal using the wireless communication section 40. In the case where BLE communication is to be performed, the communication control section 62 performs control while switching the communication mode to any of advertise, scan, connection, and disconnection. During execution of the "advertise" mode, the communication control section 62 performs transmission control for advertising packets (hereinafter referred to as "advertisement packets") for providing notification of the services that the image forming apparatus 12 may provide (i.e. information processing that the image forming apparatus 12 may execute) while referencing packet transmission information 70 and a transmission management list 72. The term "advertisement packets" means data to be transmitted including communication information that is necessary to exchange information and that is prescribed by each protocol correlated with one or more types of information processing, or information to be provided.

FIG. 4A illustrates an example of the structure of data of the packet transmission information 70 in FIG. 3. The packet transmission information 70 is data in a table form that indicate the correlation among a service name, a universally unique identifier (UUID), a transmission condition, and an attribute prescribed by a protocol for transmitting the advertisement packets. The "UUID" is unique identification information provided to a BLE service and included in the Generic Attribute (GATT) profile. The type of the advertisement packets may be classified in accordance with the difference in the format or the difference in the UUID in the same format.

The "transmission condition" includes a "duration" (unit: s) for which the advertisement packets are continuously transmitted in time-division transmission to be discussed later, and a transmission interval (unit: ms) of the advertisement packets. The "attribute" includes sub items "resident" which indicates whether or not the information processing is of a resident type, "connection" which indicates whether or not the information processing is of a connection type, and "job dependency" which indicates whether or not the advertisement packets are of a job-dependent type.

The term "resident-type process" means a process that is always executed or executable during operation of the image forming apparatus 12. On the other hand, the term "non-resident-type process" means a process, execution of which is started or ended in response to occurrence of an event during operation of the image forming apparatus 12.

The "connection-type process" means a process that involves connection with the portable terminal 14 to exchange information. In this case, the advertisement packets include communication information (such as ID information for connection, for example) that is necessary for subsequent GATT communication. On the other hand, the "non-connection-type process" means a process that does not involve connection with the portable terminal 14 to exchange information. In this case, the advertisement packets include information (such as an IP address or a multi-function device ID, for example) to be provided.

The "job-dependent type" means that the advertisement packets are transmitted while an image forming job including image processing is not executed, but that the advertisement packets are not transmitted during execution of the image forming job. On the other hand, the "non-job-dependent type" means that the advertisement packets are transmitted irrespective of whether or not an image forming job is being executed.

FIG. 4B illustrates an example of the structure of data of the transmission management list 72 in FIG. 3. The transmission management list 72 is data in a list form in which a UUID, a duration, a transmission interval, and a data content are listed for each registration number. The "data content" stores character strings that indicate a header, a footer, and a data body of the advertisement packets, for example.

[Operation of Image Forming Apparatus 12] The image forming apparatus 12 according to the exemplary embodiment is configured as described above. Subsequently, operation of the image forming apparatus 12, in particular transmission control for the advertisement packets by the communication control section 62, will be described with reference to FIGS. 5 to 9A and 9B.

1. Transmission Control for Advertisement Packets

Figure 5:
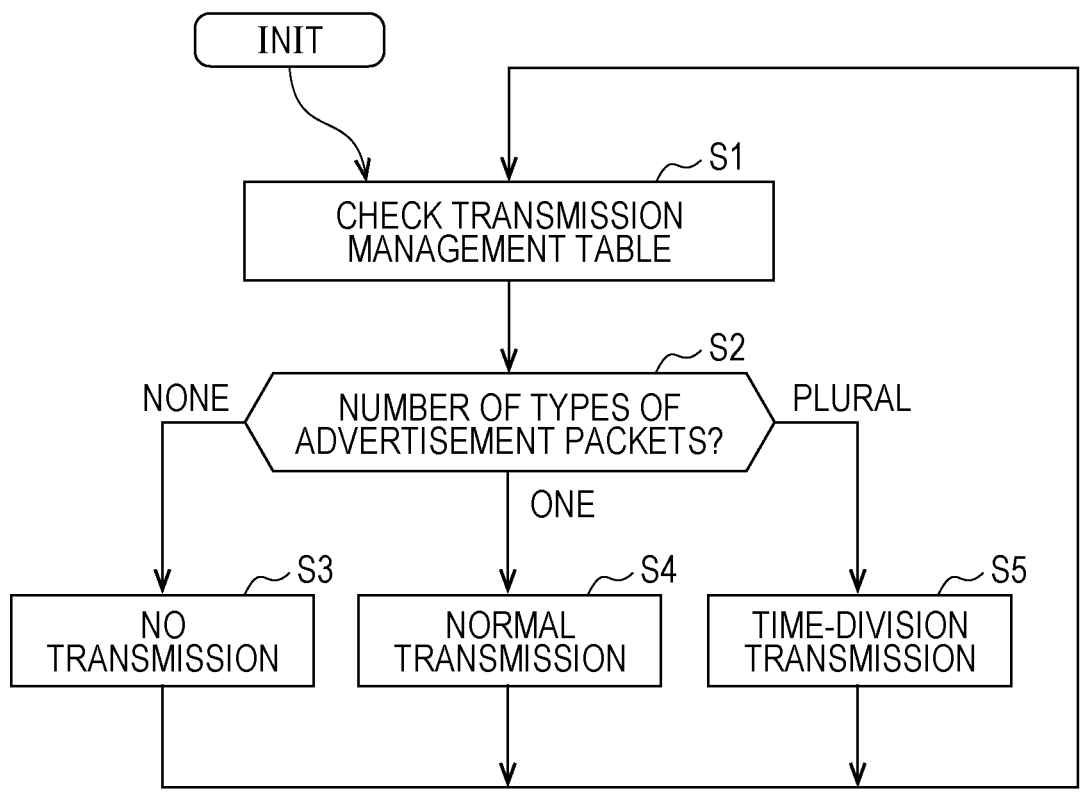
FIG. 5 is a flowchart related to transmission control by the principal controller.

FIG. 5 is a flowchart related to transmission control by the communication control section 62. First, the communication control section 62 checks the transmission management list 72 (step S1). The communication control section 62 determines the number of types of advertisement packets currently registered in the transmission management list 72 (step S2). In the case where the number of types is "0" (step S2: none), the communication control section 62 performs control so as not to transmit advertisement packets (step S3).

In the case where the number of types of advertisement packets is one (step S2: one), the communication control section 62 performs control so as to transmit the one type of advertisement packets in a normal mode (step S4). The "normal mode" means continuously transmitting advertisement packets at intervals determined in advance.

In the case where the number of types of advertisement packets is two or more (step S2: plural), the communication control section 62 performs control so as to transmit the plurality of types of advertisement packets in a time-division manner (step S5). The "time-division transmission" means transmitting the plurality of types of advertisement packets in a round-robin manner at transmission timings assigned thereto so as not to overlap each other.

In the example in FIGS. 4A and 4B, the communication control section 62 sequentially performs control so as to transmit first advertisement packets (UUID-1) corresponding to "IP address communication" 100 times at intervals of 100 ms, transmit second advertisement packets (UUID-21) corresponding to "position notification 1" 100 times at intervals of 200 ms, and transmit third advertisement packets (UUID-22) corresponding to "position notification 2" 100 times at intervals of 200 ms. Subsequently, the communication control section 62 performs control so as to transmit advertisement packets prescribed by protocols corresponding to the three functions described above in a round-robin manner.

The process returns to step S1 after any of steps S3, S4, and S5 described above. The transmission control by the communication control section 62 is performed successively by repeating operation in the flowchart illustrated in FIG. 5.

2. List Update Control

Figure 6:
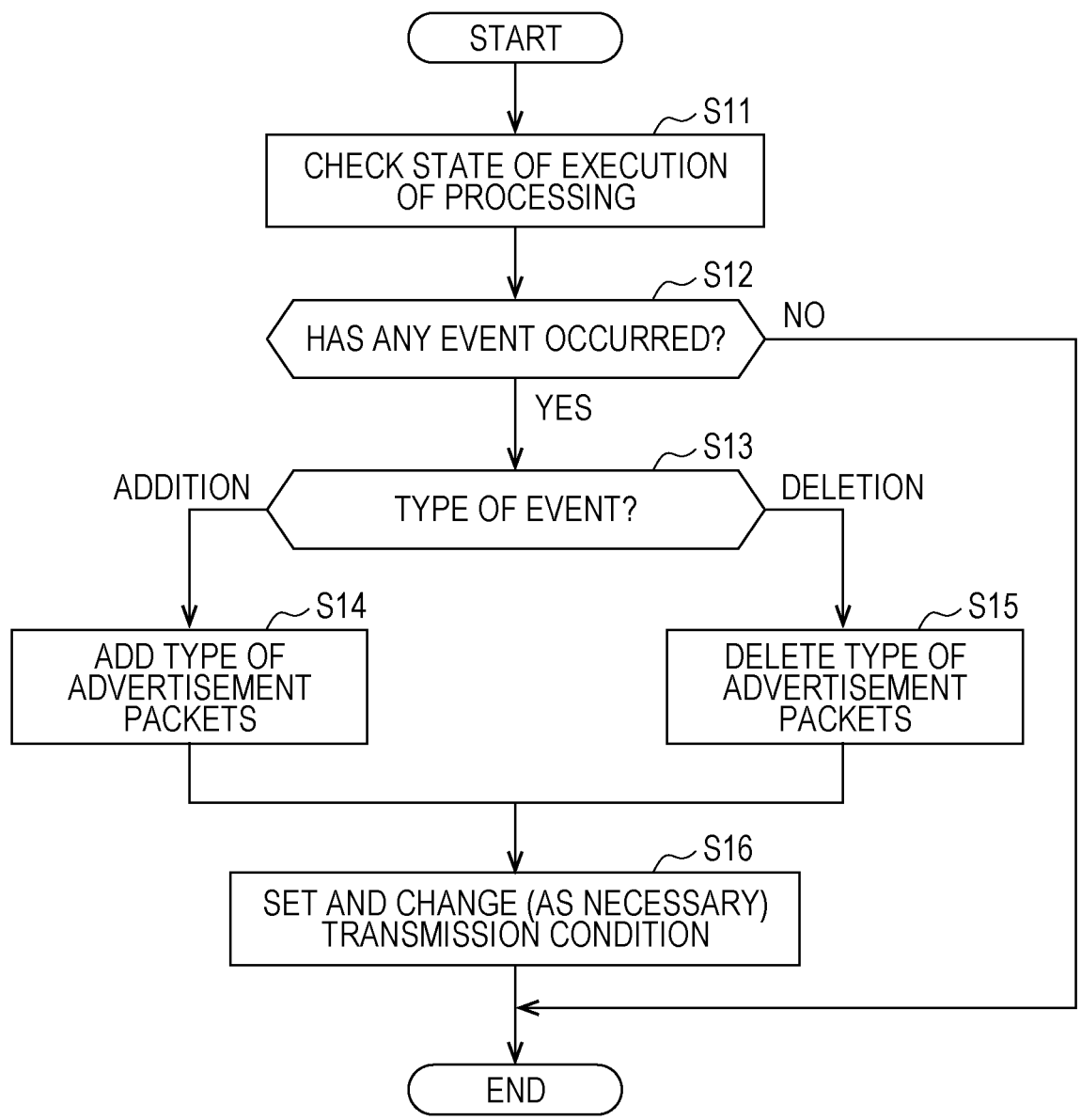
FIG. 6 is a flowchart related to list update control by the principal controller.

FIG. 6 is a flowchart related to list update control by the communication control section 62. It should be noted that this flowchart is executed in execution cycles determined in advance, independently of the transmission control in FIG. 5.

In step S11, the communication control section 62 checks the state of execution of processing by the information processing section 60. Here, the communication control section 62 checks whether or not a notification that a particular event related to information processing or image processing has occurred is received from the information processing section 60. Examples of the event include [1] start or end of an application (hereinafter referred to as an "apparatus-side app") of the image forming apparatus 12, [2] start or end of an application (hereinafter referred to as a "terminal-side app") of the portable terminal 14, [3] a particular operation performed by the user during execution of the apparatus-side app or the terminal-side app, and [4] start or end of an image forming job.

In step S12, the communication control section 62 checks whether or not any particular event has occurred in step S11. In the case where no such event has occurred (step S12: NO), operation indicated by the flowchart is ended. If at least one such event has occurred (step S12: YES), on the other hand, the process proceeds to step S13.

In step S13, the communication control section 62 recognizes the type of the event, the occurrence of which has been confirmed in step S12. The type of the event is classified into an "addition" event that serves as a trigger for starting transmission of advertisement packets, and a "deletion" event that serves as a trigger for ending transmission of advertisement packets.

In the case where the type of the event is "addition" (step S13: addition), the communication control section 62 adds the type of the advertisement packets corresponding to the relevant information processing to the transmission management list 72 (step S14). In the case where the type of the event is "deletion" (step S13: deletion), on the other hand, the communication control section 62 deletes the type of the advertisement packets corresponding to the relevant information processing from the transmission management list 72 (step S15).

[1] For example, the communication control section 62 may add the type of advertisement packets corresponding to non-resident-type information processing at the timing when the information processing section 60 starts the non-resident-type information processing, and delete the type of the advertisement packets, which has been added temporarily, at the timing when the information processing section 60 ends the information processing.

[2] The communication control section 62 may also delete at least one of the types of advertisement packets to be transmitted at the timing when the information processing section 60 starts image processing, and add the type of the advertisement packets, which has been deleted temporarily, at the timing when the information processing section 60 ends the image processing.

In particular, in the case where a large amount of data is exchanged with the portable terminal 14 which is connected, the processing load on the image forming apparatus 12 tends to be increased. Thus, the communication control section 62 may delete the type of advertisement packets corresponding to connection-type information processing, which involves connection with the portable terminal 14 to exchange information, at the timing when the information processing section 60 starts image processing.

[3] A plurality of types of advertisement packets that have substantially the same function but different formats are occasionally prepared in accordance with the difference in software (OS or app) installed in the portable terminal 14, such as "position notification 1" and "position notification 2" indicated in FIG. 4A. For example, in the case where only some of advertisement packets are to be added or deleted, the user may disadvantageously not receive the same service, depending on the model of the portable terminal 14 that he/she owns. Thus, the communication control section 62 may add or delete the type of advertisement packets corresponding to two or more types of information processing for exchanging the same or similar information at the same timing.

In step S16, the communication control section 62 sets, or changes as necessary, the transmission condition for advertisement packets registered in the transmission management list 72. For example, the communication control section 62 may set the transmission condition (i.e. a default value) included in the packet transmission information 70 for the type of advertisement packets newly added in step S14. The communication control section 62 may also change the transmission condition for the type of advertisement packets already registered in the transmission management list 72.

In general, the non-resident-type information processing is often executed in response to a request in a situation in which there is a high need to exchange information between the image forming apparatus 12 and the portable terminal 14. Thus, the communication control section 62 may perform control so as to transmit advertisement packets corresponding to the non-resident-type information processing with a high degree of priority compared to advertisement packets corresponding to the resident-type information processing.

Similarly, connection between the image forming apparatus 12 and the portable terminal 14 is often established in response to a request in a situation in which there is a high need to exchange information therebetween. Thus, the communication control section 62 may perform control so as to transmit advertisement packets corresponding to the connection-type information processing with a high degree of priority compared to advertisement packets corresponding to the non-connection-type information processing.

A "high degree of priority" in time-division transmission corresponds to an increased number of times of transmission per unit time. Specific methods to achieve a high degree of priority include extending a duration, shortening transmission intervals, and a combination of both. Conversely, a "low degree of priority" in time-division transmission corresponds to a reduced number of times of transmission per unit time, and is achieved by shortening a duration, extending transmission intervals, or a combination of both, for example.

Thus, operation indicated in the flowchart is ended. Consequently, the image forming apparatus 12 transmits (in particular, in a time-division manner) advertisement packets that are suitable for the state of execution of the process in accordance with the transmission management list 72 which is updated dynamically.

3. Specific Example

Subsequently, a specific example of the transmission control and the list update control described above will be described with reference to FIGS. 7 to 9A and 9B.

Figure 7:
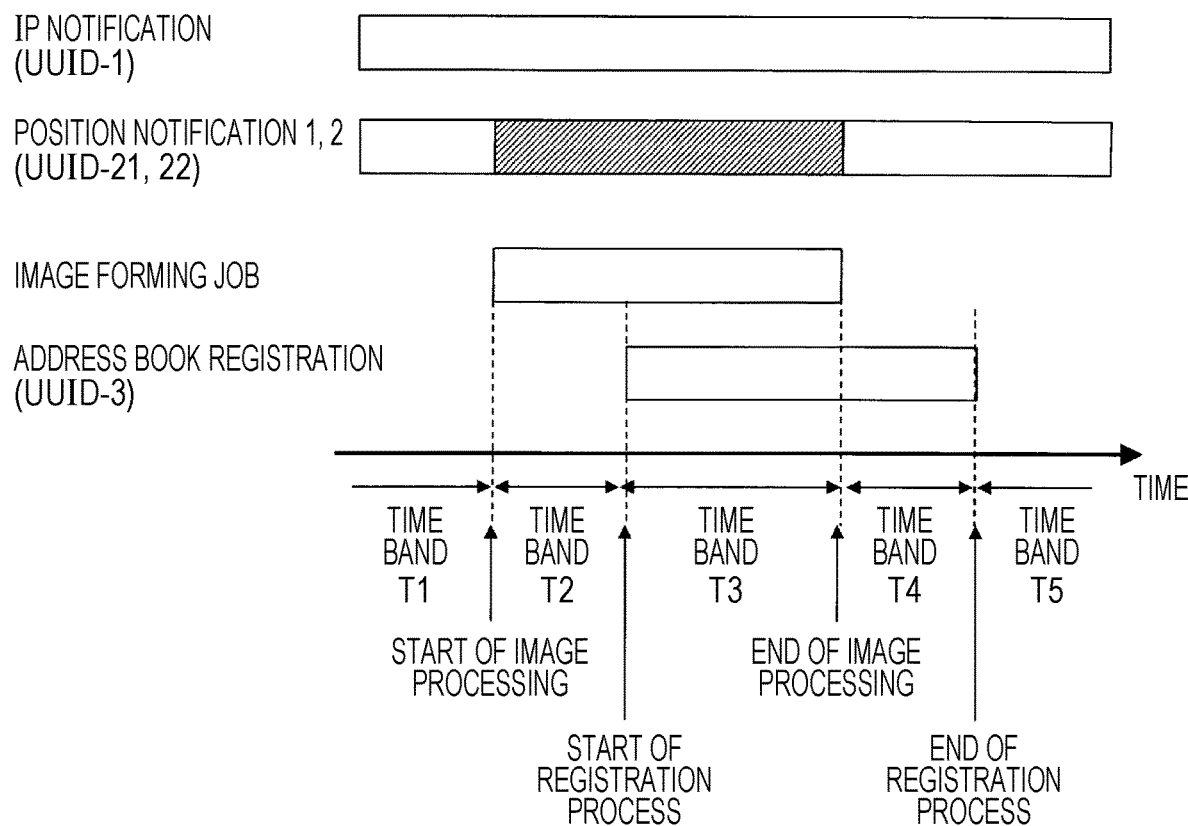
FIG. 7 is a time chart illustrating an example of the status of occurrence of an event.

FIG. 7 is a time chart illustrating an example of the status of occurrence of an event. The drawing indicates the state of provision of five services, namely "IP notification", "position notification 1", "position notification 2", "image forming job", and "address book registration". Among the five services, the former three services involve a resident-type process, while the remaining two services involve a non-resident-type process. Image processing corresponding to the "image forming job" is started when an operation by the user on the UI section 35 (FIG. 2) is received, and ended when a desired formed image object is obtained, for example. A registration process corresponding to the "address book registration" is started in conjunction with the start of a terminal-side app, and ended in conjunction with the end of the terminal-side app, for example.

A sequence of operation by the communication control section 62 will be described below separately for five time bands T1, T2, T3, T4, and T5. The first time band T1 indicates a state before the start of the image processing and the registration process. The second time band T2 indicates a state during the execution of the image processing and before the start of the registration process. The third time band T3 indicates a state during the execution of the image processing and during the execution of the registration process. The fourth time band T4 indicates a state after the end of the image processing and during the execution of the registration process. The fifth time band T5 indicates a state after the end of the image processing and the registration process.

In the first time band T1, the communication control section 62 performs control so as to transmit three types of advertisement packets corresponding to "IP notification", "position notification 1", and "position notification 2" in a time-division manner in accordance with the transmission management list 72 illustrated in FIG. 8A. After that, in the case where a notification that the image processing has been started is received from the information processing section 60, the communication control section 62 deletes two types of advertisement packets corresponding to "position notification 1" and "position notification 2" from the transmission management list 72 at the same time. As a result, the transmission management list 72 is updated from the state in FIG. 8A to the state in FIG. 8B.

In the second time band T2, the communication control section 62 performs control so as to transmit one type of advertisement packets corresponding to "IP notification" in accordance with the transmission management list 72 illustrated in FIG. 8B. After that, in the case where a notification that the registration process has been started is received from the information processing section 60, the communication control section 62 adds one type of advertisement packets corresponding to "address book registration" to the transmission management list 72. As a result, the transmission management list 72 is updated from the state in FIG. 8B to the state in FIG. 8C.

In the third time band T3, the communication control section 62 performs control so as to transmit two types of advertisement packets corresponding to "IP notification" and "address book registration" in a time-division manner in accordance with the transmission management list 72 illustrated in FIG. 8C. After that, in the case where a notification that the image processing has been ended is received from the information processing section 60, the communication control section 62 adds the two types of advertisement packets (i.e. position notification 1 and position notification 2), which have been temporarily deleted, to the transmission management list 72. As a result, the transmission management list 72 is updated from the state in FIG. 8C to the state in FIG. 9A.

In the fourth time band T4, the communication control section 62 performs control so as to transmit four types of advertisement packets corresponding to "IP notification", "address book registration", "position notification 1", and "position notification 2" in a time-division manner in accordance with the transmission management list 72 illustrated in FIG. 9A. After that, in the case where a notification that the registration process has been ended is received from the information processing section 60, the communication control section 62 deletes one type of advertisement packets corresponding to "address book registration" from the transmission management list 72. As a result, the transmission management list 72 is updated from the state in FIG. 9A to the state in FIG. 9B.

In the fifth time band T5, the communication control section 62 performs control so as to transmit three types of advertisement packets corresponding to "IP notification", "position notification 1", and "position notification 2" in a time-division manner in accordance with the transmission management list 72 illustrated in FIG. 9B. Consequently, the original state indicated in FIG. 8A is recovered.

4. Conclusion

As has been described above, the image forming apparatus 12 which serves as an information processing apparatus includes: the information processing section 60 (information processing unit) which performs a plurality of types of information processing for exchanging information with the portable terminal 14 (device); the wireless communication section 40 (wireless communication unit) which is capable of transmitting and receiving a radio-wave or spatial-light wireless signal to and from the portable terminal 14; and the communication control section 62 (communication control unit) which controls the wireless communication section 40 so as to transmit, as a wireless signal, advertisement packets correlated with one or more types of information processing and including communication information that is necessary to exchange information or information to be provided, the communication control section 62 performing control so as to continue time-division transmission of the advertisement packets while adding or deleting a type of the advertisement packets to be transmitted in accordance with a state of execution of the processing by the information processing section 60.

In the information processing method and the information processing program, the image forming apparatus 12 executes a communication control step (S5 in FIG. 5) of performing control so as to continue time-division transmission of the advertisement packets while adding or deleting (S14 and S15 in FIG. 6) a type of the advertisement packets to be transmitted in accordance with a state of execution of the processing by the information processing section 60.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
an information processing unit that performs a plurality of types of information processing for exchanging information with a device;
a wireless communication unit that is capable of transmitting and receiving a radio-wave or spatial-light wireless signal to and from the device; and
a communication control unit that controls the wireless communication unit so as to transmit, as a wireless signal, advertisement packets correlated with one or more types of information processing and including communication information that is necessary to exchange information or information to be provided, the communication control unit performing control so as to continue time-division transmission of the advertisement packets while adding or deleting a type of the advertisement packets to be transmitted in accordance with a state of execution of the processing by the information processing unit,
wherein in a case where a number of types of the advertisement packets is two or more, and in a case where the plurality of types of information processing comprise a first type information processing and a second type information processing, the communication control unit performs control so as to transmit advertisement packets corresponding to the first type information processing with a high degree of priority compared to advertisement packets corresponding to the second type information processing.

2. The information processing apparatus according to claim 1,
wherein the information processing unit is capable of executing non-resident-type information processing, and
the communication control unit adds a type of the advertisement packets corresponding to the non-resident-type information processing at a timing when the non-resident-type information processing is started, and deletes the type of the advertisement packets, which has been added temporarily, at a timing when the non-resident-type information processing is ended.

3. The information processing apparatus according to claim 2, wherein the information processing unit is further capable of executing image processing for processing image information that indicates an image, and the communication control unit deletes at least one type of the advertisement packets to be transmitted at a timing when the information processing unit starts the image processing, and adds the type of the advertisement packets, which has been deleted temporarily, at a timing when the information processing unit ends the image processing.

4. The information processing apparatus according to claim 3, wherein the communication control unit deletes the type of the advertisement packets corresponding to connection-type information processing, which involves connection with the device to exchange information, at the timing when the information processing unit starts the image processing.

5. The information processing apparatus according to claim 4, wherein the information processing unit is capable of executing resident-type information processing and non-resident-type information processing, and the communication control unit performs control so as to transmit advertisement packets corresponding to the non-resident-type information processing with a high degree of priority compared to advertisement packets corresponding to the resident-type information processing.

6. The information processing apparatus according to claim 2, wherein the information processing unit is capable of executing resident-type information processing and non-resident-type information processing, and the communication control unit performs control so as to transmit advertisement packets corresponding to the non-resident-type information processing with a high degree of priority compared to advertisement packets corresponding to the resident-type information processing.

7. The information processing apparatus according to claim 3, wherein the information processing unit is capable of executing resident-type info nation processing and non-resident-type information processing, and the communication control unit performs control so as to transmit advertisement packets corresponding to the non-resident-type information processing with a high degree of priority compared to advertisement packets corresponding to the resident-type information processing.

8. The information processing apparatus according to claim 1, wherein the information processing unit is further capable of executing image processing for processing image information that indicates an image, and the communication control unit deletes at least one type of the advertisement packets to be transmitted at a timing when the information processing unit starts the image processing, and adds the type of the advertisement packets, which has been deleted temporarily, at a timing when the information processing unit ends the image processing.

9. The information processing apparatus according to claim 8, wherein the communication control unit deletes the type of the advertisement packets corresponding to connection-type information processing, which involves connection with the device to exchange information, at the timing when the information processing unit starts the image processing.

10. The information processing apparatus according to claim 9, wherein the information processing unit is capable of executing resident-type information processing and non-resident-type information processing, and the communication control unit performs control so as to transmit advertisement packets corresponding to the non-resident-type information processing with a high degree of priority compared to advertisement packets corresponding to the resident-type information processing.

11. The information processing apparatus according to claim 8, wherein the information processing unit is capable of executing resident-type information processing and non-resident-type information processing, and the communication control unit performs control so as to transmit advertisement packets corresponding to the non-resident-type information processing with a high degree of priority compared to advertisement packets corresponding to the resident-type information processing.

12. The information processing apparatus according to claim 1, wherein the information processing unit is capable of executing resident-type information processing and non-resident-type information processing, and the communication control unit performs control so as to transmit advertisement packets corresponding to the non-resident-type information processing with a high degree of priority compared to advertisement packets corresponding to the resident-type information processing.

13. The information processing apparatus according to claim 1, wherein the information processing unit is capable of executing connection-type information processing, which involves connection with the device to exchange information, and non-connection-type information processing, which does not involve connection with the device to exchange information, and the communication control unit performs control so as to transmit advertisement packets corresponding to the connection-type information processing with a high degree of priority compared to advertisement packets corresponding to the non-connection-type information processing.

14. The information processing apparatus according to claim 1, wherein the information processing unit is capable of executing two or more types of information processing for exchanging identical or similar information, and the communication control unit adds or deletes a type of the advertisement packets corresponding to the two or more types of information processing at an identical timing.

15. An information processing method comprising:

transmitting, as a radio-wave or spatial-light wireless signal, advertisement packets correlated with one or more types of information processing, among a plurality of types of information processing for exchanging information with a device, to the device; and performing control so as to continue time-division transmission of the advertisement packets while adding or deleting a type of the advertisement packets to be transmitted in accordance with a state of execution of the processing, wherein in a case where a number of types of the advertisement packets is two or more, and in a case where the plurality of types of information processing comprise a first type information processing and a second type information processing, advertisement packets corresponding to the first type information processing are transmitted with a high degree of priority compared to advertisement packets corresponding to the second type information processing.

16. A non-transitory computer readable medium storing a program causing a computer to execute a process, the process comprising:

transmitting, as a radio-wave or spatial-light wireless signal, advertisement packets correlated with one or more types of information processing, among a plurality of types of information processing for exchanging information with a device, to the device; and performing control so as to continue time-division transmission of the advertisement packets while adding or deleting a type of the advertisement packets to be transmitted in accordance with a state of execution of the processing, wherein in a case where a number of types of the advertisement packets is two or more, and in a case where the plurality of types of information processing comprise a first type information processing and a second type information processing, advertisement packets corresponding to the first type information processing are transmitted with a high degree of priority compared to advertisement packets corresponding to the second type information processing.

* * * * *